United States Patent [19]

Lipa

[11] Patent Number: 5,784,293
[45] Date of Patent: Jul. 21, 1998

[54] APPARATUS AND METHOD FOR DETERMINING TRANSMITTED MODULATION SYMBOLS

[75] Inventor: Robert A. Lipa, Aurora, Ill.

[73] Assignee: Motorola, Inc., Schaumburg, Ill.

[21] Appl. No.: 334,162

[22] Filed: Nov. 3, 1994

[51] Int. Cl.[6] .................................................. G06F 17/14
[52] U.S. Cl. ................... 364/514 R; 364/727; 375/200; 375/322; 371/43; 370/22; 370/21
[58] Field of Search .................. 364/514 R, 727; 375/200, 310, 322; 371/43; 332/103; 329/304; 370/22, 19, 21

[56] References Cited

U.S. PATENT DOCUMENTS

| | | | |
|---|---|---|---|
| 3,859,515 | 1/1975 | Radcliffe, Jr. | 235/164 |
| 3,956,619 | 5/1976 | Mundy et al. | 235/156 |
| 4,446,530 | 5/1984 | Tsuboka | 364/725 |
| 4,621,337 | 11/1986 | Cates et al. | 364/727 |
| 5,103,459 | 4/1992 | Gilhousen et al. | 375/1 |
| 5,204,874 | 4/1993 | Falconer et al. | 375/1 |
| 5,237,586 | 8/1993 | Bottomley | 375/1 |
| 5,280,472 | 1/1994 | Gilhousen et al. | 370/18 |
| 5,293,434 | 3/1994 | Feig et al. | 382/56 |
| 5,305,349 | 4/1994 | Dent | 375/1 |
| 5,309,474 | 5/1994 | Gilhousen et al. | 375/1 |
| 5,341,396 | 8/1994 | Higgins et al. | 375/1 |
| 5,357,454 | 10/1994 | Dents | 364/727 |
| 5,416,797 | 5/1995 | Gilhousen et al. | 375/705 |
| 5,442,627 | 8/1995 | Viterbi et al. | 370/22 |
| 5,450,453 | 9/1995 | Frank | 375/200 |
| 5,465,269 | 11/1995 | Schaffner et al. | 375/200 |
| 5,471,497 | 11/1995 | Zehavi | 375/200 |
| 5,490,165 | 2/1996 | Blakeney, II et al. | 375/205 |
| 5,497,395 | 3/1996 | Jou | 375/205 |
| 5,511,067 | 4/1996 | Miller | 370/18 |

*Primary Examiner*—Ellis B. Ramirez
*Assistant Examiner*—Patrick Assouad
*Attorney, Agent, or Firm*—Daniel C. Crilly; Jeffrey G. Toler

[57] ABSTRACT

A receiver (100) employs an apparatus (109) and method (500) for determining transmitted modulation symbols contained in a received communication signal (127). Each of a plurality of memory locations (201–208) is loaded (503) with a binary representation (120) of a corresponding portion of the received communication signal (127). At least three of the binary representations (120) are transformed (505) in parallel into signed magnitudes (121) that correspond to the received modulation symbols. The magnitudes (121) are then used (507, 509) in the search and demodulation process (113) to recover the originally transmitted modulation symbols.

11 Claims, 4 Drawing Sheets

−1 INDICATES SUBTRACTION

300

APPARATUS AND METHOD FOR DETERMINING TRANSMITTED MODULATION SYMBOLS

RELATED INVENTION

Reference is made to copending U.S. patent application Ser. No. 08/269,403, entitled "A Method and Apparatus For Identifying A Coded Communication Signal," filed on Jun. 30, 1994, containing related subject matter and assigned to the assignee of the present invention.

FIELD OF THE INVENTION

The present invention relates generally to radio communication receivers and, in particular, to a Fast Hadamard Transform implementation in a radio communication receiver.

BACKGROUND OF THE INVENTION

Communication receivers are known to comprise a signal receiver and a demodulator. The signal receiver converts a received radio frequency (RF) communication signal into a baseband signal. The demodulator processes the baseband signal to recover the originally transmitted speech or data. Some communication receivers, such as direct sequence code division multiple access (DS-CDMA) receivers, further include a means for performing a Fast Hadamard Transform (FHT) to facilitate the demodulation of transmitted modulation symbols (e.g., so-called Walsh symbols) contained in the received communication signal. The FHT transforms despread portions (e.g., so-called Walsh chips) of the received modulation symbols into signed magnitudes that indicate the probability that particular transmitted modulation symbols were received. The signed magnitude outputs from the FHT are typically provided to a searcher/demodulator that searches for energy maximums corresponding to the particular transmitted modulation symbols based on processing of the signed magnitudes. The searcher/demodulator then demodulates the modulation symbols contained in the received communication signal based on these energy maximums.

One typical FHT implementation performs an FHT by storing input data (e.g., the aforementioned Walsh chips) at addresses in random access memory (RAM) and accessing the data from the addresses in a particular manner to perform matrix computations associated with an FHT. These matrix computations are described on pages 162–166 of the text "Adaptive and Digital Signal Processing," authored by Claude S. Lindquist, and published by Steward & Sons, 1989. However, the RAM has an inherently limited access time (i.e., the time from when the address is selected until the time when the address provides data at the RAM's output) and few number of ports (i.e., the number of different addresses that can provide data at the same time). Thus, the FHT computational bandwidth (computations per second) of the RAM is restricted by its access time and port limitations, thereby limiting signal-to-noise ($E_b/N_o$) performance of the searcher/demodulator.

Another FHT implementation utilizes a single parallel adder and circulating shift registers to sequentially compute the elements in the FHT matrix. However, due to the presence of only one adder and the sequential nature of the computations, the FHT computational bandwidth of this implementation is as restricted as the FHT computational bandwidth of the RAM-based implementation.

Therefore, a need exists for an apparatus and method for determining transmitted modulation symbols contained in a received communication signal that overcome the FHT computational bandwidth limitations of typical FHT implementations, thereby enhancing the signal-to-noise performance of the receiver.

DESCRIPTION OF A PREFERRED EMBODIMENT

Generally, the present invention encompasses an apparatus and method for determining transmitted modulation symbols contained in a received communication signal. Each of a plurality of memory locations is loaded with a binary representation of a corresponding portion of the received communication signal. At least three of the binary representations are transformed in parallel to produce transformed representations (e.g., signed magnitudes) corresponding to the received modulation symbols. The magnitudes are then used in the search and demodulation process to recover the originally transmitted modulation symbols. By determining the magnitudes of the received modulation symbols in this manner, the present invention provides an increased FHT computational bandwidth as compared with the FHT bandwidths of existing FHT implementations. Thus, the present invention frees digital signal processing time (cycles per second) previously used for FHT computations and permits the freed time to now be utilized for more advanced demodulation techniques that enhance the signal-to-noise performance of the receiver.

Figure 1:
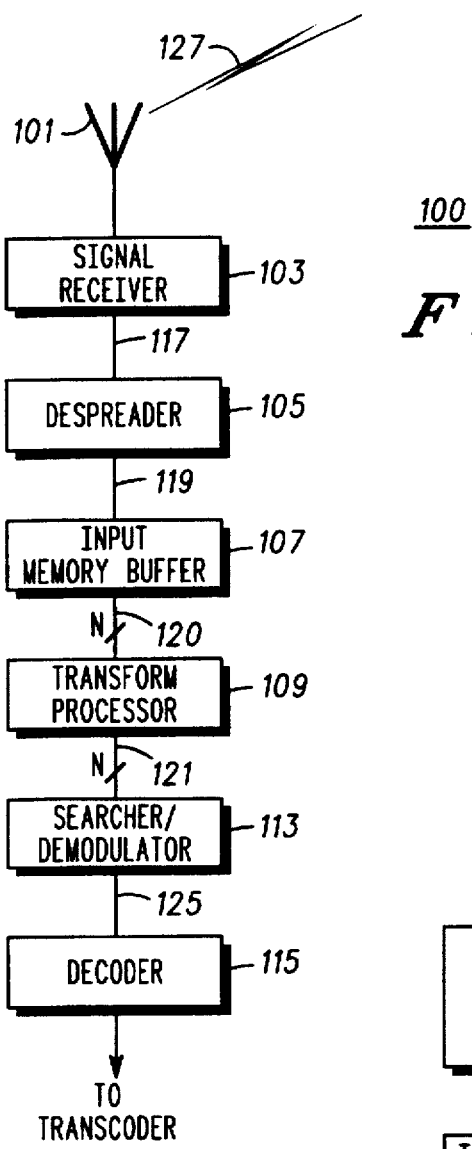
FIG. 1 illustrates a receiver in accordance with the present invention.

The present invention can be more fully described with respect to FIGS. 1–5. FIG. 1 illustrates a receiver 100 in accordance with the present invention. The receiver 100 comprises an antenna 101, a signal receiver 103, a despreader 105, an input memory buffer 107, a transform processor 109, a searcher/demodulator 113, and a decoder 115. The signal receiver 103 preferably comprises known down-converters, filters, and analog-to-digital converters that produce an oversampled baseband representation 117 of a received RF communication signal 127. In a preferred embodiment, the despreader 105 comprises a digital signal processor, while the input memory buffer 107 comprises a RAM or a register file. The searcher/demodulator 113 preferably comprises a DS-CDMA demodulator contained in a portion of an application specific integrated circuit (ASIC). The decoder 115 preferably comprises a convolutional decoder, such as a Viterbi decoder. The transform processor 109 is described in detail below with regard to FIGS. 2–4.

Operation of the receiver 100, in accordance with the present invention, occurs generally as follows. An RF communication signal 127 is received by the antenna 101, which might be one of two diversity antennas depending on whether or not the receiver 100 includes diversity capability. In a preferred embodiment, the communication signal 127 comprises a wideband, spread spectrum communication signal that includes multiple modulation symbols (e.g., Walsh symbols). In the preferred embodiment, the spread spectrum communication signal 127 comprises a DS-CDMA signal, such as that specified in Electronic Industries Association/Telecommunications Association Industry Interim Standard 95 (IS-95) or that proposed by the Joint Technical Committee's (JTC) Technical Ad Hoc Group (TAG) for IS-95 based CDMA Personal Communication Service (PCS). In an alternate embodiment, the spread spectrum communication signal 127 might comprise a frequency hopping CDMA signal.

The received communication signal 127 is processed by the signal receiver 103 in accordance with known techniques to obtain an oversampled (e.g., eight times oversampled) baseband representation 117 of the received signal 127. For a received DS-CDMA signal 127, the oversampled baseband representation 117 is wideband (e.g., 1.25 MHz per sample) and comprises a complex data stream of in-phase (I) and quadrature (Q) components of the received communication signal 127. The baseband representation 117 is despread by the despreader 105 to convert the wideband representation 117 into narrower band, binary representations corresponding to portions of the received communication signal 127. In a preferred embodiment, these narrowband binary representations comprise Walsh chips 119. In a preferred embodiment, each Walsh chip 119 contains seven bits and corresponds to either the I component (I chip) or the Q component (Q chip) of the baseband representation 117. Each I component of a received modulation symbol is represented by 64 I chips and each Q component of a received modulation symbol is represented by 64 Q chips.

In a preferred embodiment, the input memory buffer 107 receives and stores the Walsh chips 119 until 64 Walsh chips (i.e., the number of Walsh chips contained in one Walsh symbol per IS-95) have been stored. The input memory buffer 107 then provides up to 64 Walsh chips 120 (e.g., I chips or Q chips) in parallel to the transform processor 109 via a multiple port (N-port) bus. In a preferred embodiment, the input memory buffer 107 provides two Walsh chips 120 at a time until all 64 Walsh chips 120 are provided. The transform processor 109 transforms the received Walsh chips 120 into signed magnitudes 121 (i.e., transformed representations) using a predetermined transformation. The signed magnitudes 121 correspond to the Walsh symbols contained in the received communication signal 127. Each of the magnitudes 121 provides an indication of the probability that a corresponding Walsh symbol was received by the receiver 100. In a preferred embodiment, the predetermined transformation comprises an FHT, although other transformations, such as a Paley transformation, may be employed. The preferred implementation and operation of the transform processor 109 is detailed below with regard to FIGS. 2–3.

The transform processor 109 provides the magnitudes 121 of the transformed Walsh chips 120 to the searcher/demodulator 113. The searcher/demodulator 113 uses the I and Q magnitudes 121 to determine the energy associated with each received Walsh symbol. In a preferred embodiment, each energy is determined by squaring the corresponding I magnitude and Q magnitude (e.g., $[I_1]^2$ and $[Q_1]^2$) and summing the squared magnitudes (e.g., $[I_1]^2 + [Q_1]^2$; $[I_2]^2 + [Q_2]^2$; etc.). The energies are ranked and the highest set of energies (e.g., highest eight energies) are selected for demodulation to determine the Walsh symbols 125 corresponding to each of the selected energies. This determination preferably includes determining the I component and the Q component of each of the determined Walsh symbols 125.

The searcher/demodulator 113 provides the determined Walsh symbols 125 to the decoder 115, where the Walsh symbols 125 are error-corrected and transferred to a transcoder (not shown) for further signal processing.

Figure 2:
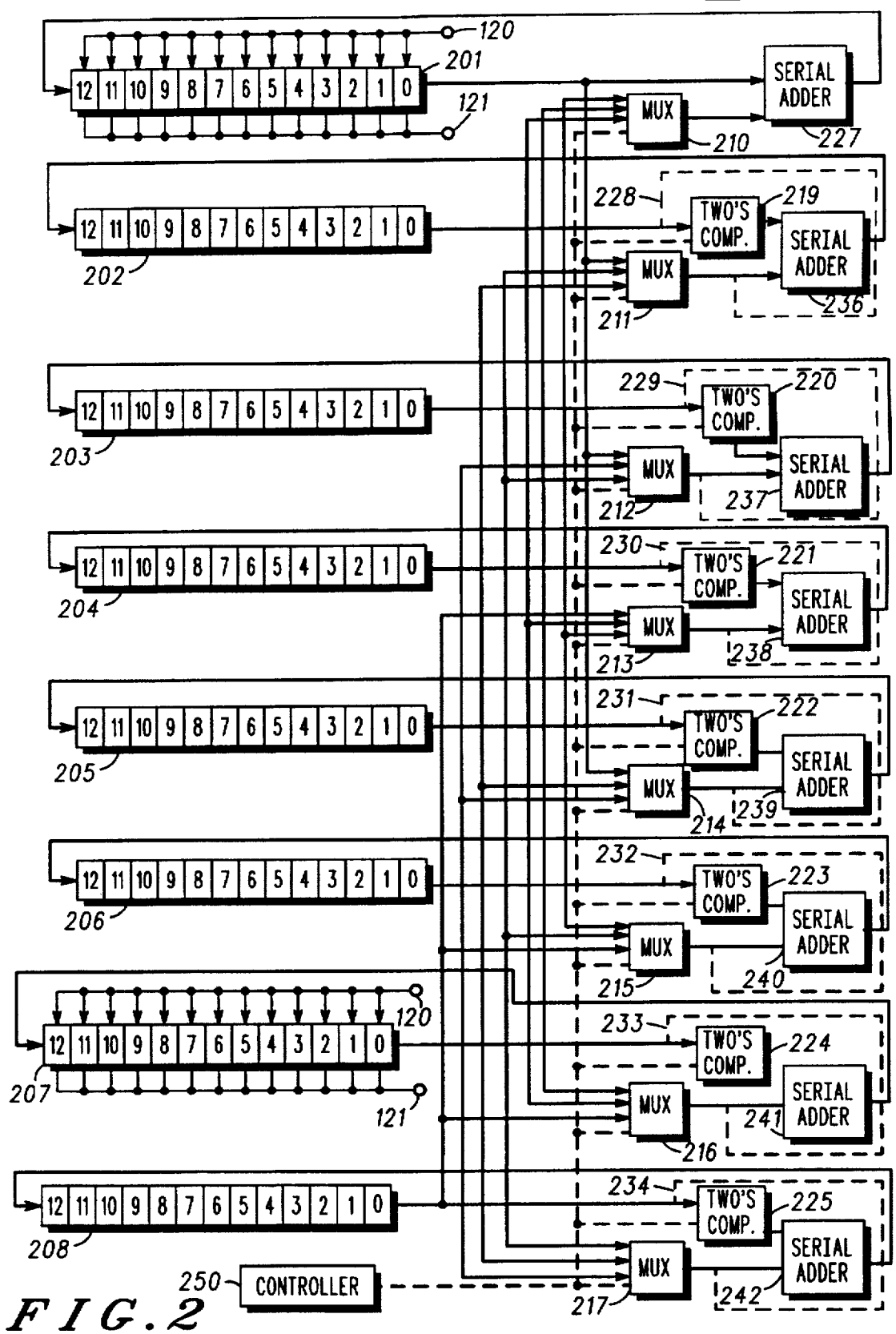
FIG. 2 illustrates a preferred embodiment of a transform processor in accordance with the present invention.

FIG. 2 illustrates a preferred embodiment of the transform processor 109 in accordance with the present invention. The transform processor 109 includes a plurality of memory locations 201–208, a plurality of multiplexing devices 210–217, a plurality of summing devices 227–234, and a controller 250. Each of the memory locations 201–208 preferably comprises a shift register. Each of the multiplexing devices 210–217 preferably comprises a multiplexer, a transmission gate, or a tri-state driver. Each of the summing devices 227–234 includes a serial single bit adder. In addition, all but one (i.e., 227) of the summing devices 227–234 further includes a two's complement generator 219–225. The controller 250 preferably comprises a state machine or a microsequencer and a read only memory (ROM).

In the preferred embodiment, the Walsh chips 120 are loaded into the memory locations 201–208 in a parallel manner, two memory locations (e.g., 201, 207) at a time, until each memory location 201–208 receives a corresponding Walsh chip 120. For example, memory location 201 might be loaded with the first Walsh chip 120 outputted from the input memory buffer 107, while memory location 207 might be loaded with the seventh Walsh chip 120 outputted from the input memory buffer 107. In the preferred embodiment, each particular pair (e.g., 201, 207) of memory locations 201–208 simultaneously receives all seven bits (bit positions 0–6) of the corresponding Walsh chip 120 together with six sign extension bits (bit positions 7–12). The sign extension bits are preferably all ones or all zeroes depending on whether the most significant bit (i.e., bit position 6) of the Walsh chip 120 is a zero or a one. In an alternate embodiment, the memory locations 201–208 might be parallel loaded one location, or port, at a time or at some multiple of two ($2^n$) ports at a time. In yet another embodiment, all the memory locations 201–208 (eight in this case) might be serially loaded in a parallel manner (e.g., simultaneously). This serial loading technique is described in detail with regard to FIG. 4.

Figure 3:
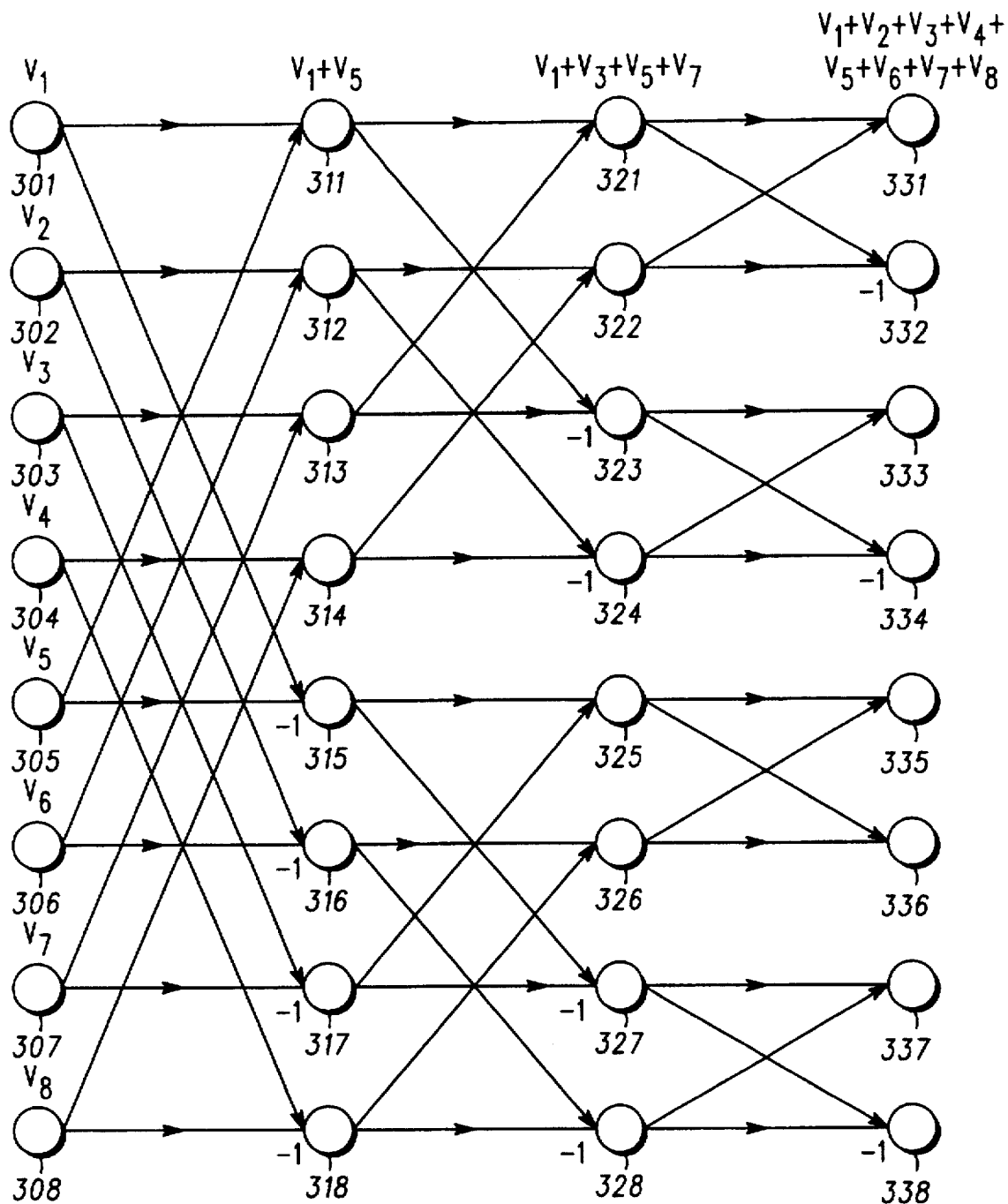
FIG. 3 illustrates a flow graph of an exemplary Fast Hadamard transformation process.

Once the memory locations 201–208 have been loaded, the transform processor 109 transforms the Walsh chips 120 into signed magnitudes corresponding to the particular Walsh symbols contained in the received communication signal. A flow graph 300 of an exemplary FHT process is depicted in FIG. 3. Reference will be made to both FIGS. 2 and 3 to describe the operation of the transform processor 109.

The transformation procedure begins when the multiplexing devices 210–217 and the two's complement generators 219–225 are initialized by the controller 250 to allow the computations (commonly referred to as butterflies) to be performed between flowgraph points 301–308 (i.e., loaded memory locations 201–208 as denoted by vector elements $V_1$–$V_8$) and flowgraph points 311–318. Each flowgraph point (e.g., 311) is a temporary value in the FHT matrix calculation. The FHT matrix is described on pages 162–166 of the Lindquist text cited above.

To obtain intermediate points 311 and 315, the least significant bit (bit position 0) of memory location 201 is directly outputted to serial adder 227 and the least significant bit of memory location 205 is outputted to serial adder 227 through multiplexing device 210. The serial adder 227 adds the inputted bits and loads the resultant bit into the most significant bit position (bit position 12) of memory location 201 as the remaining bits are right-shifted by one bit position to occupy bit positions 0–11. At substantially the same time, a similar process is occurring at memory location 205, except that the least significant bit of memory location 205 is subtracted from the least significant bit of memory location 201. Subtraction occurs because the least significant bit of memory location 205 is two's complemented in the two's complement generator 222 and the serial adder 239. In a similar manner, the remaining bits (i.e., the bits in positions 0–11) are serially outputted from the memory locations 201, 205, added or subtracted by the appropriate summing devices 227, 231, and reloaded into the most significant bit positions of the corresponding memory locations 201, 205 until all thirteen bits in each memory location 201, 205 have been updated. The resulting thirteen bits in each memory location 201, 205 comprise the intermediate points 311 (now stored in memory location 201) and 315 (now stored in memory location 205). Although described for only two memory locations 201, 205 and only two intermediate points 311, 315, the above memory location update process is preferably performed at all the memory locations 201–208 in parallel to obtain the first eight intermediate points 311–318 simultaneously. However, in a lower speed alternate embodiment, the memory location update process might be performed in parallel at only four memory locations (e.g., 201–204) at a time until all the memory locations 201–208 have been updated. It should be noted that the intermediate points 311–318 together effectively comprise a vector of summations that are partially representative of the magnitudes (e.g., $V_1+V_2+V_3+V_4+V_5+V_6+V_7+V_8$ at point 331) of the Walsh symbols contained in the received communication signal because each point (e.g., 311) is a partial summation ($V_1+V_5$) of the final summation, or magnitude.

A similar memory location updating process is then used to obtain the second eight intermediate points 321–328. For example, to obtain intermediate points 321 and 323, the least significant bit of updated memory location 201 is directly outputted to serial adder 227 and the least significant bit of updated memory location 203 is outputted to serial adder 227 through multiplexing device 210. The serial adder 227 adds the inputted bits and loads the resultant bit into the most significant bit position of memory location 201 as the remaining bits are right-shifted by one bit position to occupy bit positions 0–11. At substantially the same time, a similar process is occurring at updated memory location 203, except that the least significant bit of updated memory location 203 is subtracted from the least significant bit of updated memory location 201. Subtraction occurs because the least significant bit of updated memory location 203 is two's complemented in the two's complement generator 220 and the serial adder 237. In a similar manner, the remaining bits of each updated memory location 201, 203 are serially outputted, added or subtracted by the appropriate summing devices 227, 229, and reloaded into the most significant bit positions of the corresponding memory locations 201, 203 until all thirteen bits in each memory location 201, 203 have been updated again. The resulting thirteen bits in each memory location 201, 203 comprise the intermediate points 321 (now stored in memory location 201) and 323 (now stored in memory location 203). The memory location update process is preferably performed in parallel at all the memory locations 201–208 to obtain the second eight intermediate points 321–328 simultaneously. The second eight intermediate points 321–328 together effectively comprise a vector of summations that are more closely representative of the magnitudes of the Walsh symbols contained in the received communication signal than was the vector produced from intermediate points 311–318 due the presence of more elements in each summation term of the vector (e.g., $V_1+V_3+V_5+V_7$ at point 321).

In a similar manner, the memory locations 201–208 are updated a final time to obtain the signed magnitudes 121 at the FHT output points 331–338. The magnitudes 121 are unloaded from the memory locations 201–208 in a parallel manner and are provided to the searcher/demodulator 113 as described above with regard to FIG. 1. The controller 250 controls the sequencing of the multiplexing devices 210–217 and the two's complement generators 219–225 during the above transform processing.

Although the above discussion with respect to FIGS. 2–3 has been provided with regard to performing an eight point FHT, a skilled artisan will appreciate that the above transformation discussion can be readily adapted to a variety of other FHT scenarios (e.g., 16 point, 32 point, 64 point, etc.) by applying the known symmetry inherent in the FHT formulation. Thus, the present invention allows all 64 Walsh chips to be simultaneously transformed into their corresponding signed magnitudes for subsequent use by the searcher/demodulator 113 in identifying the transmitted Walsh symbol, or symbols, contained in the received communication signal.

Therefore, unlike prior FHT implementations, which sequentially compute each intermediate point (e.g., 311), the present invention utilizes parallel transformations to compute each group, or vector, of intermediate points (e.g., 311–318) at substantially the same time, thereby improving the FHT computational bandwidth in a DS-CDMA receiver by more than 30% as compared to the FHT computational bandwidth of prior implementations for an eight point FHT. For example, to compute an eight point FHT with thirteen bits of resolution, existing approaches require 64 time cycles (each time cycle lasting approximately 25 nanoseconds); whereas, the same computation requires only 43 time cycles using the above described techniques of the present invention. Thus, by extrapolating the above techniques to a 64 point FHT, the present invention improves the FHT computational bandwidth by more than four times the FHT computational bandwidth of prior FHT implementations. The computational speed improvement provided by the present invention reduces the number of time cycles necessary to perform the FHT, thereby freeing the previously used cycles for other processing functions, such as advanced demodulation techniques.

Figure 4:
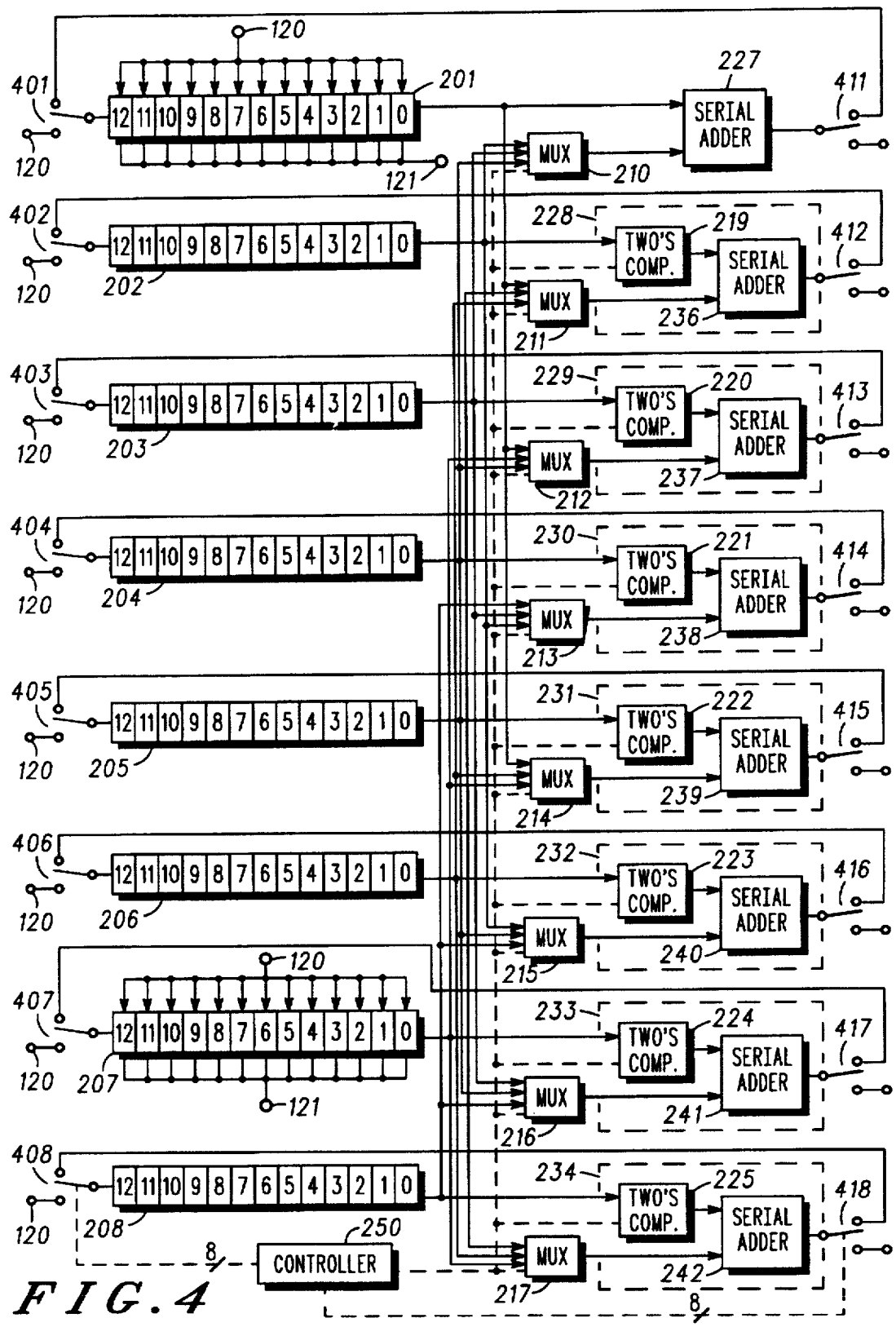
FIG. 4 illustrates an alternate embodiment of a transform processor in accordance with the present invention.

FIG. 4 illustrates an alternate embodiment of the transform processor 109 in accordance with the present invention. As shown, this embodiment of the transform processor 109 is substantially identical to the transform processor 109 of FIG. 2, except that the Walsh chips 120 are serially loaded into all the memory locations 201–208 (eight in this case) at substantially the same time (i.e., in parallel) and the transformed representations (signed magnitudes) 121 are serially provided to the searcher/demodulator 113 in parallel (i.e., all eight transformed representations provided in parallel, one bit at a time).

During the loading of the memory locations 201–208 in this embodiment, the controller 250 directs switches 401–408 to couple the output of the input memory buffer 107 to the memory locations 201–208 to allow the serial transfer of the Walsh chips 120 into the memory locations 201–208. The switches 401–408 preferably comprise multiplexers, transmission gates, or tri-state drivers. After the memory locations 201–208 are loaded, the controller 250 directs the switches 401–408 to decouple the input memory buffer 107 and, in conjunction with switches 411–418, to couple the summing devices 227–234 to their respective memory locations 201–208. The switches 411–418 are comparable to the switches 401–408. The transform processor 109 then transforms the Walsh chips 120 into signed magnitudes 121 using the FHT process as described above with regard to FIGS. 2–3. Upon completion of the transformation process, the controller 250 direct the switches 411–418 to couple the summing devices 227–234 to the searcher/demodulator 113 to permit the searcher/demodulator 113 to serially receive the signed magnitudes 121.

Figure 5:
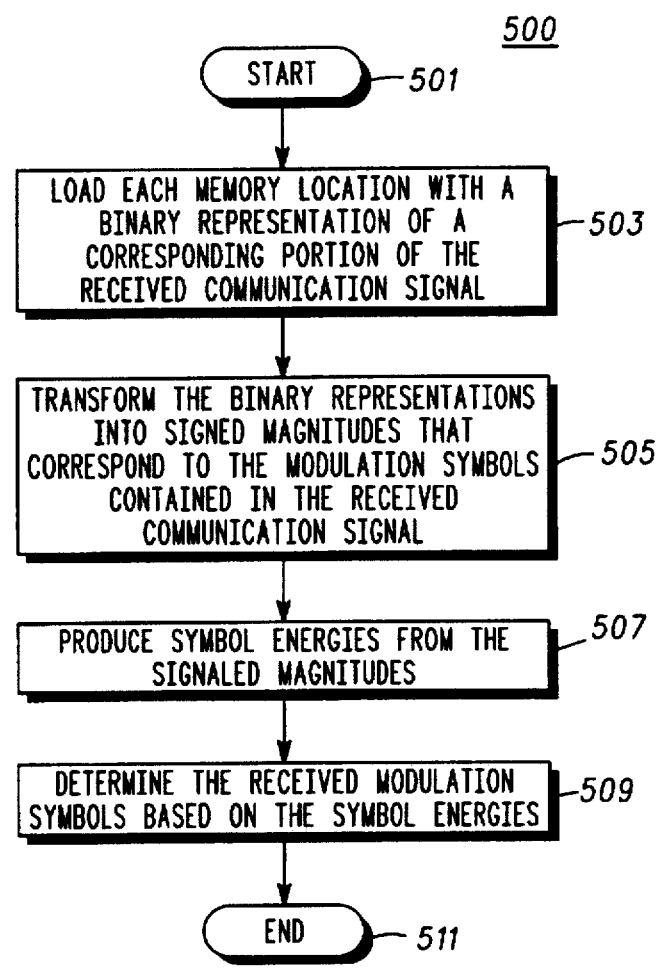
FIG. 5 illustrates a logic flow diagram of steps executed in a receiver to transform binary representations into signed magnitudes corresponding to received modulation symbols in accordance with the present invention.

FIG. 5 illustrates a logic flow diagram 500 of steps executed in a receiver to transform binary representations into signed magnitudes corresponding to received modulation symbols in accordance with the present invention. The logic flow begins (501) by loading (503) each memory location of the transform processor with a binary representation of a corresponding portion of the received communication signal. As described above, the binary representations preferably comprise Walsh chips outputted from the despreader and stored in the input memory buffer. The binary representations are preferably parallel-loaded into two memory locations at a time until all the memory locations are loaded.

The binary representations are transformed (505) into signed magnitudes that correspond to the modulation symbols contained in the received communication signal. As described above with regard to FIGS. 2–3, the transformation (e.g., FHT) is accomplished by serially shifting the bits of the binary representations out of the memory locations, computing binary additions and binary subtractions based on the FHT butterfly topology, and serially updating the binary representations until the original representations are completely transformed into the signed magnitudes. The magnitudes are used by the searcher/demodulator to produce (507) symbol energies corresponding to particular symbols contained in the received communication signal. The symbol energies are then used to determine (509) the particular received modulation symbols and the logic flow ends (511).

The present invention encompasses an apparatus and method for determining transmitted modulation symbols contained in a received communication signal. With this invention, FHT computations can be performed in at least 30% fewer time cycles than prior RAM-based or recirculating shift register implementations due to the present invention's use of parallel processing serial bit streams and the serial updating of the bit streams during the FHT computational process. The improved FHT computational bandwidth allows the receiver incorporating the present invention to use the time saved to perform advanced demodulation techniques, such as reduced state sequence estimation (RSSE) demodulation or near maximum likelihood sequence estimation (N-MLSE) demodulation, to improve the receiver's signal-to-noise performance.

What is claimed is:

1. In a receiver of a communication system a method of transforming signals comprising the steps of:

a) during a first portion of a transform process, performing a first vector mapping, the first vector mapping comprising forming a first group of selectable connections between a memory and a digital computation unit; and b) during a second portion of the transform process performing a second vector mapping, the second vector mapping comprising forming a second group of selectable connections between the memory and the digital computation unit, the second vector mapping differing from the first vector mapping.

2. The method of claim 1, wherein the transform process comprises a Fast Hadamard Transform.

3. The method of claim 1, further comprising the steps of:

loading each of a plurality of memory locations with a binary representation of a corresponding portion of a received communication signal to produce a plurality of binary representations; and transforming at least three binary representations of the plurality of binary representations in parallel to produce a plurality of transformed representations that correspond to at least one of the transmitted symbols.

4. The method of claim 3, further comprising the step of:
   determining, based on the plurality of transformed representations, at least one of the transmitted symbols.

5. The method of claim 4, wherein the determining step comprises the steps of:

using the plurality of transformed representations to produce a plurality of symbol energies;

selecting a set of symbol energies from the plurality of symbol energies having higher energy values than energy values of symbol energies of the plurality of symbol energies not in the set; and determining a transmitted symbol of the transmitted symbols associated with each symbol energy in the set.

6. The method of claim 5, wherein the step of determining a transmitted symbol further comprises the steps of:

determining an in-phase component of the transmitted symbol; and determining a quadrature component of the transmitted symbol.

7. The method of claim 5, wherein each of the transmitted symbols comprises an in-phase component and a quadrature component.

8. The method of claim 3, wherein each of the plurality of transformed representations comprises a plurality of bits that represent a magnitude of at most one of the transmitted symbols.

9. The method of claim 3, wherein said transforming step comprises the step of transforming four of the plurality of binary representations in parallel to produce the plurality of transformed representations.

10. The method of claim 3, wherein each of the transmitted symbols comprises a Walsh symbol and wherein each of the plurality of binary representations comprises a Walsh chip.

11. In a receiver of a communication system a method for determining transmitted symbols contained in a received communication signal, the method comprising the steps of:

a) parallel loading a plurality of memory locations at least two at a time until each of the plurality of memory locations contains a binary representation of a corresponding portion of the received communication signal to produce a plurality of binary representations;

b) transforming four binary representations of the plurality of binary representations in parallel to produce a plurality of transformed representations that correspond to at least one of the transmitted symbols, and c) reconfiguring a plurality of multiplexors to reconfigure connections between the plurality of memory locations and a plurality of computation units before producing the plurality of transformed representations.

* * * * *